United States Patent [19]
Dinkel et al.

[11] Patent Number: 5,928,581
[45] Date of Patent: Jul. 27, 1999

[54] SYNCHRONIZATION OF PARISON PROFILE IN A PLASTIC CONTAINER MOLDING SYSTEM

[75] Inventors: John Philip Dinkel, Perrysburg; William W. Brecheisen, Findlay, both of Ohio

[73] Assignee: Owens-Brockway Plastics Products Inc., Toledo, Ohio

[21] Appl. No.: 08/844,181

[22] Filed: Apr. 18, 1997

[51] Int. Cl.⁶ .......................... B29C 49/04; B29C 49/52; B29C 49/78
[52] U.S. Cl. .................. 264/40.5; 264/509; 264/541; 425/145; 425/172; 425/532; 425/466
[58] Field of Search ..................... 425/532, 140, 425/172, 145, 381, 466; 264/541, 40.1, 40.5, 509, 132

[56] References Cited

U.S. PATENT DOCUMENTS

| | | | |
|---|---|---|---|
| 3,368,241 | 2/1968 | Williams | 425/162 |
| 3,629,382 | 12/1971 | Fogelberg et al. | 264/541 |
| 4,444,702 | 4/1984 | Thomas et al. | 264/541 |
| 4,523,904 | 6/1985 | Martin | 425/539 |
| 5,102,588 | 4/1992 | Feuerherm | 425/140 |
| 5,185,109 | 2/1993 | Habig et al. | 425/532 |
| 5,437,702 | 8/1995 | Burns et al. | 264/40.1 |
| 5,464,107 | 11/1995 | Koeniger | 425/532 |
| 5,718,852 | 2/1998 | Campbell et al. | 264/541 |

FOREIGN PATENT DOCUMENTS

| | | |
|---|---|---|
| 3306533 A1 | 8/1984 | Germany. |
| 56-28830 | 3/1981 | Japan. |
| 58-42437 | 3/1983 | Japan. |
| 60-234821 | 11/1985 | Japan ..................................... 425/140 |
| 2109591 | 6/1983 | United Kingdom. |

*Primary Examiner*—Robert Davis

[57] ABSTRACT

In a blow-molding system in which a parison programmer is coupled to orifice tooling in an extrusion die head for controlling wall thickness of an extruded parison fed to a blow-molding apparatus, a method of synchronizing operation of the parison programmer contemplates placement of observable indicia on the parison after the parison exits the die head. This indicia placement preferably is carried out under control of the parison programmer to place the indicia at a predetermined position along the parison profile, such that mis-positioning of the indicia indicates absence of phase synchronization of the parison programmer. The indicia is then observed on a molded article to determine phasing of the parison programmer relative to the molding apparatus, and operation of the parison programmer is adjusted to correct any mis-positioning. In the preferred implementation of the invention, the readable indicia comprises an optically readable spot or dot, and position of this spot or dot on the molded article is determined by an optical sensor that provides an electrical signal for automatic closed-loop correction of parison programmer phasing without operator intervention.

15 Claims, 1 Drawing Sheet

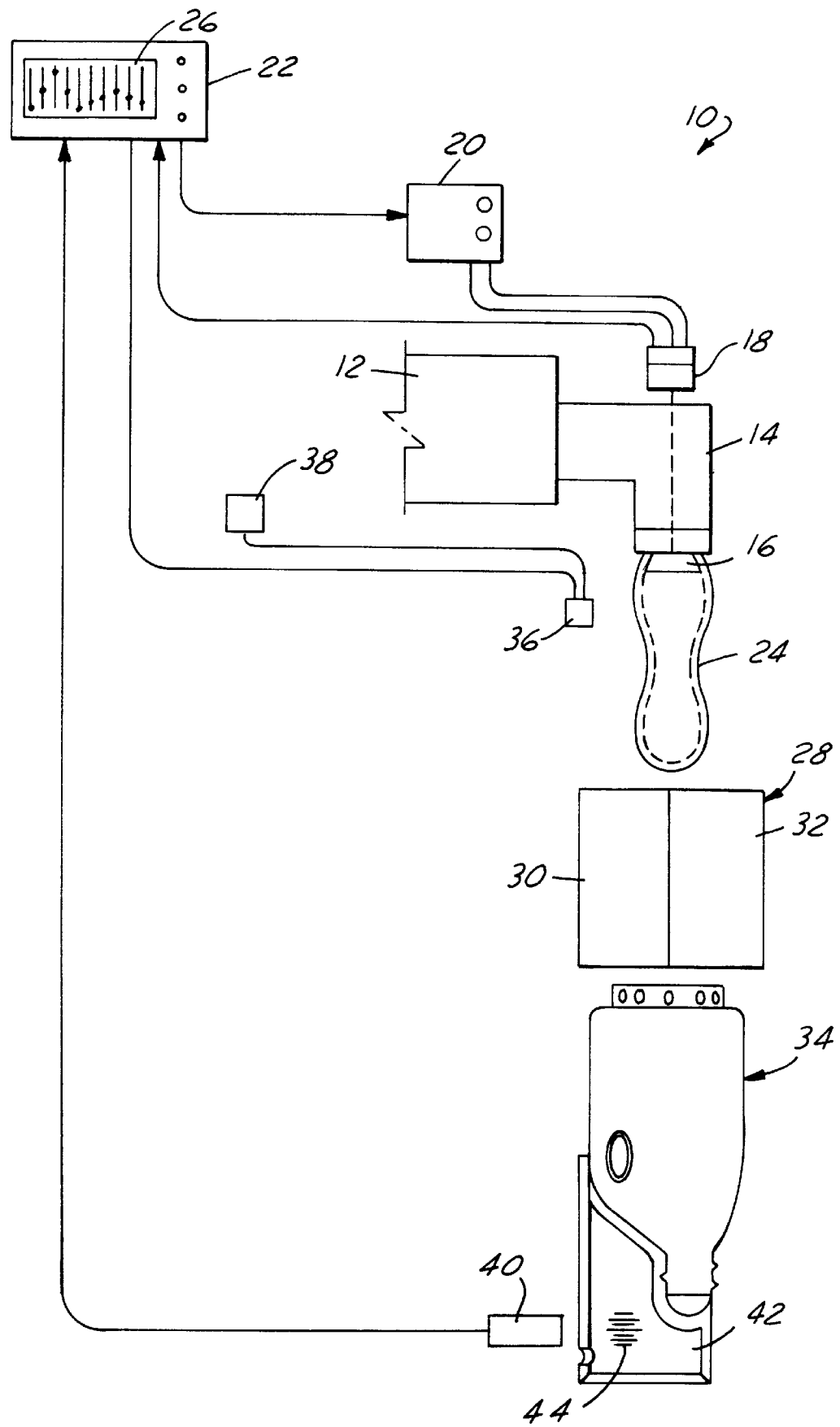

SYNCHRONIZATION OF PARISON PROFILE IN A PLASTIC CONTAINER MOLDING SYSTEM

The present invention is directed to systems for blow-molding articles such as hollow plastic containers, and more specifically to a method and apparatus for synchronizing parison wall thickness profile to the molding apparatus.

BACKGROUND AND SUMMARY OF THE INVENTION

In conventional systems for blow-molding articles such as hollow plastic containers, an extrusion die head contains orifice tooling that is controlled by a parison programmer to vary the wall thickness according to a predetermined thickness profile lengthwise of the parison. The hollow extruded parisons are fed in sequence to blow molding apparatus, typically comprising a plurality of mold-half pairs that pass in sequence adjacent to the extrusion head for receiving the parisons. A blow molding system of this character is disclosed, for example, in U.S. Pat. No. 4,523,904. The purpose of the parison programmer is to control the orifice tooling to provide a parison wall thickness that changes along the length of the parison in correspondence with changes in material requirements along the length of the molded container. Since any change in wall thickness also changes the length of the parison in a free-extrusion system, or the stretch of the parison in a captured-extrusion system, it is difficult to coordinate programmer position along the parison relative to the desired position in the molded container (i.e., programmer "phase" synchronizations).

It has heretofore been proposed to attempt to synchronize operation of the parison programmer by making a radical profile change at a specific point along the profile, and then checking the position of this radical change in the molded container. However, the act of making such a radical change itself tends to change synchronization or phase of the parison profile. Furthermore, all containers made during this process are not usable and must be scrapped. It is a general object of the present invention to provide a method and apparatus for synchronizing operation of the parison programmer in a blow-molding system of the described character that may be readily implemented in existing systems without substantial modification or expense, and that may be readily employed by relatively unskilled personnel. Another and more specific object of the present invention is to provide a method and apparatus of the described character that automatically synchronizes operation of the parison programmer to the molding apparatus in a closed loop system without operator intervention.

In a blow-molding system in which a parison programmer is coupled to orifice tooling in an extrusion die head for controlling wall thickness of an extruded parison fed to a blow-molding apparatus, a method of synchronizing operation of the parison programmer in accordance with the present invention contemplates placement of observable indicia on the parison after the parison exits the die head. This indicia placement preferably is carried out under control of the parison programmer to place the indicia at a predetermined position along the parison profile, such that mis-positioning of the indicia indicates absence of phase synchronization of the parison programmer. The indicia is then observed on a molded article to determine phasing of the parison programmer relative to the molding apparatus, and operation of the parison programmer is adjusted to correct any mis-positioning. In the preferred implementation of the invention, the readable indicia comprises an optically readable spot or dot, and position of this spot or dot on the molded article is determined by an optical sensor that provides an electrical signal for automatic closed-loop correction of parison programmer phasing without operator intervention.

Apparatus for synchronizing operation of the parison programmer in a system for blow-molding hollow plastic articles such as containers includes an ink jet device coupled to the parison programmer for placing optically readable indicia on parisons as they exit the extrusion die head at a preselected position lengthwise of the parisons coordinated with wall thickness profile programming prestored in the parison programmer. An optical sensor observes position of this optically readable indicia on containers molded by the molding apparatus, and operation of the parison programmer and orifice tooling relative to the die head and the molding apparatus is altered, preferably automatically, so as to place the indicia at a predetermined location relative to the molded container. In the preferred embodiment of the invention, the optically readable indicia is placed on a portion of the molded container that will be subsequently removed and discarded (or recycled), together with a scale molded into the container to facilitate operator observation of parison programmer phasing.

DETAILED DESCRIPTION OF THE DRAWING

The invention, together with additional objects, features and advantages thereof, will be best understood from the following description, the appended claims and the accompanying drawing, which is a schematic diagram of a system for blow-molding hollow plastic containers embodying parison programmer synchronization in accordance with a presently preferred embodiment of the invention.

DETAILED DESCRIPTION OF PREFERRED EMBODIMENTS

The drawing illustrates a system 10 for blow-molding hollow plastic containers as comprising an extruder 12 that receives molten plastic from a source not shown. The plastic is fed by extruder 12 to a die head 14 that includes orifice tooling 16 coupled to suitable positioning means such as an hydraulic servo actuator 18. Actuator 18 is connected to an hydraulic power pack 20 that is controlled by a parison programmer 22. Programmer 22 also receives a feedback signal from servo actuator 18. Programmer 22, which may comprise a PLC or microprocessor-based controller, contains prestored programming for controlling the position of orifice tooling 16 relative to extrusion head 14, and thereby controlling wall thickness of the parisons 24 formed by extrusion head 14. Such prestored programming relates parison wall thickness profile to lengthwise position along parison 24, and may be displayed on an operator screen 26 as an incremental function of parison axial length. The successive parisons 24 are fed to molding apparatus 28, which may include a series of mold-half pairs 30, 32 on a moveable turntable. The sequential parisons 24 are captured between mold halves 30, 32 and blow-molded to form blown containers generally indicated at 34.

To the extent thus far described, system 10 is of generally conventional construction. Above-noted U.S. Pat. No. 4,523,904, assigned to the assignee hereof, shows a system of this character in greater detail, and is incorporated herein by reference for purposes of background.

In accordance with the present invention, an ink jet device 36 is placed adjacent to the outlet of die head 14, such as by mounting on the die head, and is connected to a source 38 of suitable ink and other associated hardware. Ink jet device 36 is electronically controlled by a signal from parison programmer 22. Ink jet device 36 is controlled by parison programmer 22 to place a dot or spot of ink on parison 24 as the parison exits die head 14 and at a position lengthwise of the parison coordinated with the wall thickness profile stored within programmer 22. That is, ink jet device 36 is operated by programmer 22 to place optically readable indicia in the form of an ink spot or dot at a predetermined position along parison 24 coordinated with a predetermined position along the prestored parison profile.

An optical sensor 40 is positioned downstream of molding apparatus 28 for detecting the position of the optically readable indicia on molded container 34, and for providing an electrical feedback signal to controller 22 as a function of such position. For example, in the illustration of the drawing, the optically readable indicia is placed on parison 24 so as to be located in the moil 42 of container 34. The position of the ink dot relative to the axial length of moil 42 and container 34 is fed back to controller 22, at which such actual position is compared with the desired position along the parison wall thickness profile. If actual position of the ink dot is misplaced relative to the desired position, such mis-positioning indicates absence of phase synchronization of the parison programmer. The variable profile output of programmer 22 to power pack 20 is then advanced or retarded so as to correct such mis-synchronization, and consequently to correct misplacement of the ink dot relative to the molded container.

In the preferred embodiment of the invention illustrated in the drawings, a scale 44 is also molded into container moil 42, which will assist operator determination of misplacement of the ink dot. Operator observation of ink dot misplacement may lead to manual phase synchronization of the parison programmer, although fully automatic and continuous closed loop synchronization is preferred. Operation of ink jet device 36 and sensor 40 may be continuously enabled, or periodically enabled at suitable control intervals. Placement of the ink dot and scale 44 in moil 42 means that the scale and ink dot will eventually be removed from container 34, and discarded or recycled. The ink dot is preferably, although not necessarily, of ultraviolet-responsive ink to enhance observability under suitable lighting.

We claim:

1. A method of synchronizing operation of a parison programmer in a system for blow-molding hollow plastic containers in which the parison programmer is coupled to orifice tooling means in an extrusion die head for controlling wall thickness of an extruded parison fed to a blow molding apparatus, and has programming prestored therein for controlling parison wall thickness according to a predetermined profile of wall thickness as a function of position lengthwise of the parison, said method comprising the steps of:

(a) providing means adjacent to the die head for placing observable indicia on a parison exiting the die head,
    (b) controlling operation of said indicia-placing means as a function of the profile programming in the parison programmer so as nominally to place said indicia at a predetermined position on the parison coordinated with said profile and nominally at a position that is subsequently removed from the molded article,
    (c) molding a position scale into the molded article at said position that is subsequently removed from the molded article,
    (d) observing position of said indicia on an article blow-molded in said apparatus relative to said position scale to determine misplacement of the indicia lengthwise of the article, and
    (e) adjusting phasing of said parison programmer relative to said apparatus to reduce any misplacement observed in said step (d).

2. The method set forth in claim 1 wherein said step (e) is carried out automatically.

3. The method set forth in claim 2 wherein said step (d) is carried out by an optical sensor that produces an output signal as a function of position of said indicia on a molded article, and wherein said step (d) is carried out automatically as a function of said signal.

4. In a system for blow-molding hollow plastic containers that includes an extrusion die head, orifice tooling means in said die head, parison programming means coupled to said orifice tooling means for controlling wall thickness profile of a parison extruded from said extrusion die head, and blow-molding means for receiving parisons from said extrusion die head and blow-molding hollow plastic containers from said parisons, apparatus for synchronizing operation of said parison programming means comprising:

means coupled to said parison programming means for placing optically readable indicia on a parison as it exits said extrusion die head at a preselected position lengthwise of said parison coordinated with wall thickness profile and at a position that is subsequently removed from the molded container,
    means for observing position of said indicia on a container molded by said blow-molding means, and
    means for altering operation of said parison programming means and said orifice tooling means relative to said die head and said blow-molding means so as to place said indicia at predetermined location relative to the molded container.

5. A method of synchronizing a parison programmer in an article blow-molding system in which the parison programmer is coupled to orifice tooling means in an extrusion die head for controlling wall thickness of an extruded parison fed to a blow-molding apparatus, said parison programmer having programming prestored therein for controlling parison wall thickness according to a predetermined profile as a function of position along said parison, said method comprising the steps of:

(a) placing observable indicia on a parison after the parison exits the die head under control of said parison programmer so as to place said indicia at a predetermined position relative to said profile, such that mis-positioning of said indicia on the molded articles indicates absence of phase synchronization of the parison programmer,
    (b) blow-molding an article from said parison,
    (c) observing position of said indicia on the article molded in said step (b) to determine phasing of the parison programmer relative to the blow-molding apparatus, and
    (d) adjusting operation of the parison programmer to correct mis-positioning of said indicia on the molded article and thereby correct phase synchronization of the parison programmer,
    said step (b) comprising the step of molding a position scale into the molded article, and said step (c) comprising the step of observing position of indicia relative to said scale.

6. A method of synchronizing a parison programmer in an article blow-molding system in which the parison programmer is coupled to orifice tooling means in an extrusion die head for controlling wall thickness of an extruded parison fed to a blow-molding apparatus, said parison programmer having programming prestored therein for controlling parison wall thickness according to a predetermined profile as a function of position along said parison, said method comprising the steps of:

(a) placing observable indicia on a parison after the parison exits the die head under control of said parison programmer so as to place said indicia at a predetermined position relative to said profile, such that mis-positioning of said indicia on the molded articles indicates absence of phase synchronization of the parison programmer, (b) blow-molding an article from said parison, (c) observing position of said indicia on the article molded in said step (b) to determine phasing of the parison programmer relative to the blow-molding apparatus, and (d) adjusting operation of the parison programmer to correct mis-positioning of said indicia on the molded article and thereby correct phase synchronization of the parison programmer, said indicia being placed in said step (a) on the parison at a position that is subsequently removed from the molded article.

7. The system set forth in claim 6 wherein said blow-molding means includes means for molding a position scale into the molded article at said position that is subsequently removed from the molded article, such that position of said indicia on the container may be observed relative to said scale.

8. In a system for blow-molding hollow plastic containers that includes an extrusion die head, orifice tooling means in said die head, parison programming means coupled to said orifice tooling means for controlling wall thickness profile of a parison extruded from said extrusion die head, and blow-molding means for receiving parisons from said extrusion die head and blow-molding hollow plastic containers from said parisons, apparatus for synchronizing operation of said parison programming means comprising:

means in said blow-molding means for molding a position scale into the molded container, means coupled to said parison programming means for placing optically readable indicia on a parison as it exits said extrusion die head at a preselected position lengthwise of said parison coordinated with wall thickness profile and with said position scale, means for observing position of said indicia relative to said position scale on a container molded by said blow-molding means, and means for altering operation of said parison programming means and said orifice tooling means relative to said die head and said blow-molding means so as to place said indicia at predetermined location relative to the molded container.

9. The method set forth in claim 5 or 6 wherein said step (c) is carried out by an optical sensor that produces an output signal as a function of position of said indicia on a molded article, and wherein said step (d) is carried out automatically as a function of said signal.

10. The method set forth in claim 6 wherein said step (b) comprises the step of molding a position scale into the molded article, and wherein said step (c) comprises the step of observing position of said indicia relative to said scale.

11. The method set forth in claim 5 wherein said indicia is placed in said step (a) on the parison at a position that is subsequently removed from the molded article.

12. The system set forth in claim 4 wherein said position-observing means comprises means for providing an electrical signal as a function of position of said indicia on the molded container, and wherein said operation-altering means includes means responsive to said electrical signal for automatically altering operation of said parison programming means without operator intervention.

13. The system set forth in claim 12 or 8 wherein said indicia-placing means comprises means for placing a spot of ink on the parison.

14. The system set forth in claim 13 wherein said ink comprises ultra-violet ink.

15. The system set forth in claim 8 wherein said position scale and said indicia are placed on a portion of said container that is removed subsequent to molding.

\* \* \* \* \*